(12) United States Patent
Thomas

(10) Patent No.: US 10,846,250 B2
(45) Date of Patent: Nov. 24, 2020

(54) APPARATUS AND METHOD FOR HANDLING ADDRESS DECODING IN A SYSTEM-ON-CHIP

(71) Applicant: Arm Limited, Cambridge (GB)

(72) Inventor: Tessil Thomas, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/186,913

(22) Filed: Nov. 12, 2018

(65) Prior Publication Data
US 2020/0151124 A1    May 14, 2020

(51) Int. Cl.
*G06F 13/20* (2006.01)
*G06F 13/42* (2006.01)
*G06F 13/40* (2006.01)

(52) U.S. Cl.
CPC .......... *G06F 13/20* (2013.01); *G06F 13/4282* (2013.01); *G06F 2213/0026* (2013.01)

(58) Field of Classification Search
CPC . G06F 12/1081; G06F 9/4408; G06F 13/4068
See application file for complete search history.

(56) References Cited

U.S. PATENT DOCUMENTS

| | | | |
|---|---|---|---|
| 9,032,102 B2 | 5/2015 | Granovsky et al. | |
| 9,864,701 B1* | 1/2018 | Khan | G06F 13/102 |

(Continued)

FOREIGN PATENT DOCUMENTS

EP    2 778 931    9/2014

OTHER PUBLICATIONS

"Flattening Portal Bridge (FPB)", PCI-SIG Engineering Change Notice, Apr. 19, 2016, 30 pages.

(Continued)

*Primary Examiner* — Getente A Yimer
(74) *Attorney, Agent, or Firm* — Nixon & Vanderhye P.C.

(57) ABSTRACT

An apparatus and method are provided for handling address decoding in a system-on-chip (SoC). The SoC has processing circuitry for performing data processing operations, a first plurality of devices, and an interconnect to couple the processing circuitry to the first plurality of devices. The first plurality of devices are a first level of devices within a hierarchical structure of devices forming a device network. Those devices communicate using a device communication protocol which also provides an enumeration mechanism to enable software executed on the processing circuitry to discover and configure the devices within the network. The system address space provides a pool of addresses that are reserved for allocation to the first plurality of devices. An address decoder of the SoC has a device address decoder to maintain, for each device in the first plurality of devices, an indication of which addresses within the pool are allocated to that device. Hence, when a request is issued by the processing circuitry identifying an address within the pool of addresses, the device address decoder can be used to determine the appropriate device within the first plurality of devices that the request is directed to. The device address decoder is exposed to the software as a device of the device network so as to enable the software executing on the processing circuitry to discover and configure the device address decoder using the enumeration mechanism. As a result, the allocation of the pool of addresses amongst the first plurality of devices can be dynamically reconfigured under software control.

18 Claims, 10 Drawing Sheets

(56) References Cited

U.S. PATENT DOCUMENTS

| | | | |
|---|---|---|---|
| 2005/0193276 A1* | 9/2005 | Kang | G06F 11/2236 |
| | | | 714/45 |
| 2011/0197017 A1* | 8/2011 | Yu | G06F 12/0246 |
| | | | 711/103 |
| 2011/0320759 A1 | 12/2011 | Craddock et al. | |
| 2015/0117224 A1* | 4/2015 | Lih | H04L 12/437 |
| | | | 370/238 |
| 2015/0324319 A1* | 11/2015 | Leidel | G06F 13/1673 |
| | | | 711/148 |
| 2016/0291986 A1* | 10/2016 | Warkentin | G06F 9/4411 |
| 2016/0380747 A1* | 12/2016 | Low | H04L 5/16 |
| | | | 370/276 |
| 2017/0123815 A1* | 5/2017 | Sarmah | G06F 9/4408 |
| 2017/0255582 A1 | 9/2017 | Harriman et al. | |

OTHER PUBLICATIONS

International Search Report and Written Opinion of the International Searching Authority for PCT/GB2019/052331 dated Nov. 4, 2019, 13 pages.

* cited by examiner

APPARATUS AND METHOD FOR HANDLING ADDRESS DECODING IN A SYSTEM-ON-CHIP

BACKGROUND

The present technique relates to an apparatus and method for handling address decoding in a system-on-chip (SoC).

Within a SoC, it is often the case that the main processing devices within the SoC, such as one or more processor cores, can be coupled via an interconnect with a network of devices, such as input/output (I/O) devices or accelerator devices. Often, the network of devices are arranged to communicate using a particular device communication protocol, and that device communication protocol may provide an enumeration mechanism to enable software executed on the processing circuitry of the SoC to discover and configure the devices within the device network.

One example of such a device communication protocol is the Peripheral Component Interconnect Express (PCIe) protocol. By providing the enumeration mechanism, it is possible to support hot plug/hot swap functionality in respect of the devices of the network, where following a change in the configuration or number of devices, the enumeration mechanism can be re-performed in order to discover and configure the devices within the network.

Regions within the system address space of the SoC can be reserved for allocating to the various devices within the network. Often the network of devices is arranged in a hierarchical manner, and separate address regions may be reserved for each of a number of different devices at an upper level in the hierarchy. However, typically it has been necessary to conservatively reserve large portions of system address space for allocation to such devices, to accommodate worst case scenarios as to the number, and memory requirements, of the devices lower in the hierarchy that may be connected to those devices. This gives rise to a major scalability issue that can inhibit the deployment of larger multi-root PCIe hierarchies.

SUMMARY

In one example arrangement, there is provided a system-on-chip comprising: processing circuitry to perform data processing operations; a first plurality of devices; an interconnect to couple the processing circuitry to the first plurality of devices, the first plurality of devices being a first level of devices within a hierarchical structure of devices forming a device network, where devices within the device network are arranged to communicate using a device communication protocol, the device communication protocol providing an enumeration mechanism to enable software executed on the processing circuitry to discover and configure the devices within the network of devices; and an address decoder to decode an address specified by a request issued by the processing circuitry in order to determine a recipient for the request; within a system address space a pool of addresses being reserved for allocation to the first plurality of devices, and the address decoder comprising a device address decoder to maintain, for each device in the first plurality of devices, an indication of which addresses within the pool are allocated to that device; wherein the address decoder is responsive to detecting that the address specified by the request is within the pool of addresses, to employ the device address decoder to determine which device amongst the first plurality of devices the request is directed to and to cause the request to be routed to the determined device within said first plurality; wherein the device address decoder is arranged to be exposed to the software as a device of the device network so as to enable the software executing on the processing circuitry to discover and configure the device address decoder using the enumeration mechanism, thereby enabling the allocation of the pool of addresses amongst the first plurality of devices to be dynamically reconfigured under software control.

In another example arrangement, there is provided a method of handling address decoding in a system-on-chip having processing circuitry to perform data processing operations, a first plurality of devices, and an interconnect to couple the processing circuitry to the first plurality of devices, the first plurality of devices being a first level of devices within a hierarchical structure of devices forming a device network, the method comprising: causing the devices within the device network to communicate using a device communication protocol, the device communication protocol providing an enumeration mechanism to enable software executed on the processing circuitry to discover and configure the devices within the network of devices; employing an address decoder to decode an address specified by a request issued by the processing circuitry in order to determine a recipient for the request; within a system address space, reserving a pool of addresses for allocation to the first plurality of devices; providing a device address decoder within the address decoder to maintain, for each device in the first plurality of devices, an indication of which addresses within the pool are allocated to that device; responsive to detecting that the address specified by the request is within the pool of addresses, employing the device address decoder to determine which device amongst the first plurality of devices the request is directed to and routing the request to the determined device within said first plurality; and exposing the device address decoder to the software as a device of the device network so as to enable the software executing on the processing circuitry to discover and configure the device address decoder using the enumeration mechanism, thereby enabling the allocation of the pool of addresses amongst the first plurality of devices to be dynamically reconfigured under software control.

In a yet further example arrangement, there is provided a system-on-chip comprising: processing means for performing data processing operations; a first plurality of devices; interconnect means for coupling the processing means to the first plurality of devices, the first plurality of devices being a first level of devices within a hierarchical structure of devices forming a device network, where devices within the device network are arranged to communicate using a device communication protocol, the device communication protocol providing an enumeration mechanism to enable software executed on the processing means to discover and configure the devices within the network of devices; and address decoder means for decoding an address specified by a request issued by the processing means in order to determine a recipient for the request; within a system address space a pool of addresses being reserved for allocation to the first plurality of devices, and the address decoder means comprising a device address decoder means for maintaining, for each device in the first plurality of devices, an indication of which addresses within the pool are allocated to that device; wherein the address decoder means is responsive to detecting that the address specified by the request is within the pool of addresses, to employ the device address decoder means to determine which device amongst the first plurality of devices the request is directed to and to cause the request to be routed to the determined device within said first plurality; wherein the device address decoder means is arranged to be exposed to the software as a device of the device network so as to enable the software executing on the processing means to discover and configure the device address decoder means using the enumeration mechanism, thereby enabling the allocation of the pool of addresses amongst the first plurality of devices to be dynamically reconfigured under software control.

BRIEF DESCRIPTION OF THE DRAWINGS

The present technique will be described further, by way of example only, with reference to examples thereof as illustrated in the accompanying drawings, in which.

DESCRIPTION OF EXAMPLES

Figure 1:
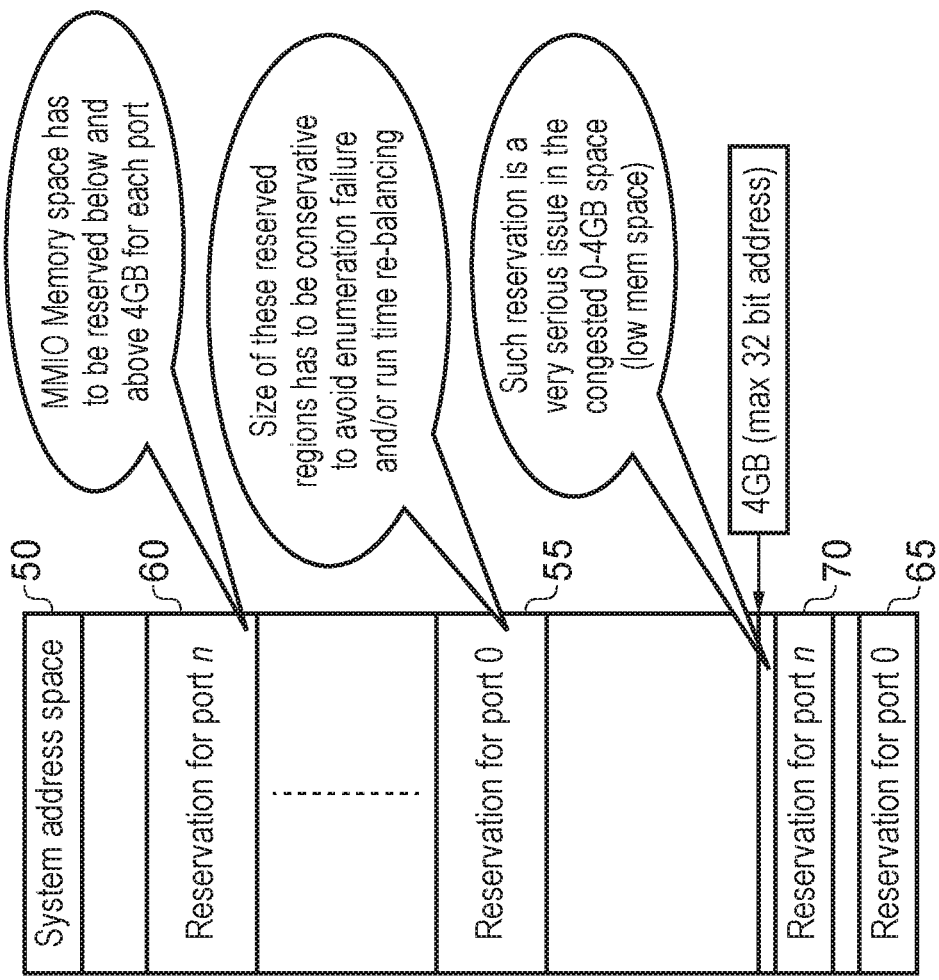
FIG. 1 is a diagram schematically illustrating the scalability issue that can arise when allocating separate memory regions to different ports within a hierarchical structure of devices forming a device network.
Figure 1:
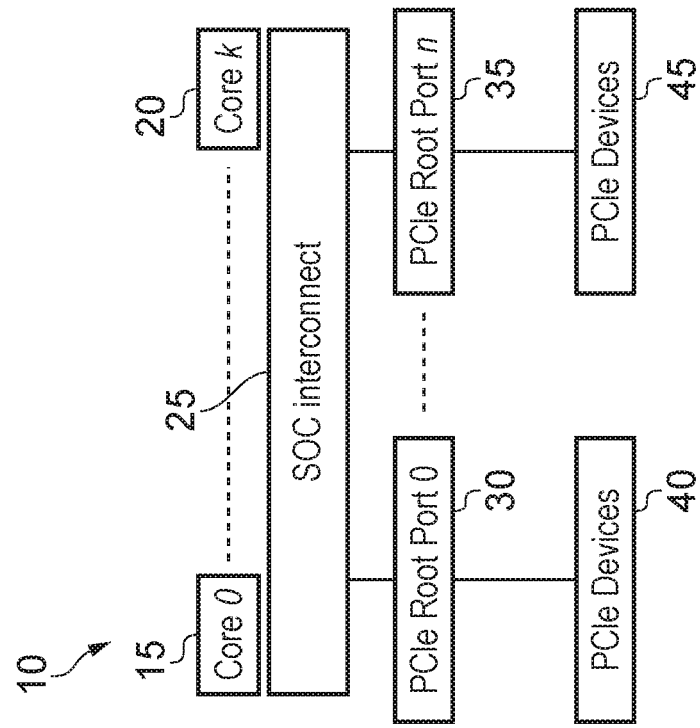

As discussed earlier, when connecting a hierarchical structure of devices forming a device network to an interconnect within a SoC, it has typically been necessary to conservatively reserve large portions of system address space for allocation of memory mapped I/O (MMIO) regions to those devices. In particular, it may typically not be known when considering a device at a high level in the hierarchical structure, such as a root port, how many devices will be coupled to that device, or what the memory requirements of those devices may be, and accordingly a conservatively large region of address space may be allocated for a device such as a root port. This can give rise to major scalability issues.

As mentioned earlier, one commonly used communication protocol for such a network of devices is the PCIe protocol, which provides an enumeration mechanism to enable software executed on the processing circuitry of the SoC to discover and configure the devices within the network. The Peripheral Component Interconecct Special Interest Group (PCI-SIG) has introduced a Flattening Portal Bridge (FPB) address decoding mechanism described in the PCI-SIG Engineering Change Notice of February 2017 (a copy of which is available at https://pcisig.com/sites/default/files/specification_documents/ECN_FPB_9_Feb_2017.pdf). The FPB mechanism allows for a more efficient and dense allocation of routing IDs within the network, and defines mechanisms to allocate routing IDs and memory space resources in non-contiguous ranges, enabling system software to assign pools of these resources from which it can allocate "bins" to functions below the Flattening Portal Bridge. A bridge that implements the FPB capability is itself referred to as an FPB, and the FPB mechanism can be enabled or disabled for particular bridges.

Hence, when employing the FPB scheme in association with a particular bridge device (also referred to herein as a root port device), address region portions within a pool of address space can be allocated to particular devices below the FPB, and the FPB can determine whether to propagate on a communication through the bridge dependent on whether the address specified for that communication falls within one of the address regions allocated to particular devices on the other side of the bridge.

The FPB scheme can assist in making more efficient use of available memory address space, through the allocation of pools of addresses. However, the FPB scheme is defined only for PCI bridges. Further, to be able to optimise the potential benefits available through the use of such an FPB scheme, the PCI-SIG have indicated that new hardware and software will be required, and in particular it will only be possible to achieve significant benefits from the scheme if there is SoC level support for the FPB address decoding mechanism.

The techniques described herein seek to provide an efficient and effective mechanism for providing such SoC level support for FPB address decoding.

In one example arrangement, a system-on-chip has processing circuitry for performing data processing operations, a first plurality of devices, and an interconnect to couple the processing circuitry to the first plurality of devices. The first plurality of devices form a first level of devices within a hierarchical structure of devices forming a device network. Devices within the device network communicate using a device communication protocol, and that protocol provides an enumeration mechanism to enable software executed on the processing circuitry to discover and configure the devices within the network of devices. The software used for this process can take a plurality of forms, but may for example be operating system software and/or boot firmware that can be used to employ the enumeration mechanism provided by the device communication protocol.

The SoC further has an address decoder to decode an address specified by a request issued by the processing circuitry in order to determine a recipient for the request. Within a system address space, a pool of addresses are reserved for allocation to the first plurality of devices, and the address decoder has a device address decoder to maintain, for each device in the first plurality of devices, an indication of which addresses within the pool are allocated to that device. As a result, upon detecting that the address specified by the request is within the pool of addresses, the device address decoder can be employed to determine which device amongst the first plurality of devices the request is directed to, and to cause the request to be routed to the determined device within the first plurality.

The techniques described herein provide a very efficient and effective mechanism for maintaining the required information within the device address decoder. In particular, the device address decoder is arranged to be exposed to the software as a device of the device network. As a result, this enables the software executing on the processing circuitry to discover and configure the device address decoder using the enumeration mechanism. As a result, by employing the standard enumeration mechanism provided for the device communication protocol, the presence of the device address decoder can be determined by the software executing on the processing circuitry, and furthermore the standard techniques for configuring devices within the device network can then also be employed to configure the device address decoder. As a result, this provides a standardised mechanism for capturing at the decode level within the SoC the required information necessary to enable the routing of requests to the various devices forming the first plurality of devices within the hierarchical structure.

Since the enumeration mechanism can be re-invoked each time there is a change in the number or configuration of the devices within the device network, for example due to hot plug or hot swap activities, the above described mechanism enables the information maintained by the device address decoder to be automatically updated during any re-performance of the enumeration mechanism, and as such provides a very efficient and effective mechanism for enabling the allocation of the pool of addresses amongst the first plurality of devices to be dynamically reconfigured under software control. During this process, the software can seek to adjust how the pool of addresses are allocated so as to accommodate the changes in the network configuration without having to perform an invasive rebalancing process to reconfigure all of the devices in the network.

Such a mechanism for managing the address decoding within the SoC enables a much more efficient use to be made of the system address space, by avoiding the need to conservatively reserve large portions of system address space for use in allocating to the various devices within the network in order to seek to avoid the above invasive rebalancing issue. For example, considering the earlier discussed FPB mechanism proposed by PCI-SIG, by forming the device address decoder in the manner set out above, a very effective, efficient, and standardised mechanism is provided for facilitating SoC level support for the FPB address decoding mechanism, enabling significant savings in address space to be realised when allocating address space for a PCIe network of devices, and enabling efficient re-allocation of the address space within the pool.

There are a number of ways in which the device address decoder may be arranged to be exposed to the software, but in one example arrangement the device address decoder is exposed as an integrated endpoint device, i.e. it is considered to be an endpoint within the network of devices, and is integrated into the SoC.

The first plurality of devices can take a variety of forms, but in one embodiment comprise a plurality of bridge devices, which may also be referred to as root port devices.

There are a number of device communication protocols with which the above described technique may be utilised. In particular, there are a number of device communication protocols that provide an enumeration mechanism to enable software executing on the processing circuitry of the SoC to discover and configure the devices, hence supporting hot plug/hot swap functionality. However, in one example configuration, the device communication protocol is the Peripheral Component Interconnect Express (PCIe) protocol, and the device address decoder is arranged to be exposed to the software as a root complex integrated endpoint device. Within the PCIe protocol, by providing the device address decoder as a root complex device, this provides a simple mechanism for the software executing on the processing circuitry to see the device address decoder as an enumerable device.

In one example arrangement, the device address decoder has an associated root bus via which the device address decider is accessible by the software executed on the processing circuitry. Hence, the device address decoder may have its own root bus to the software running on the processing circuitry that is used to discover and configure the devices of the network. This ensures that standard PCIe methods can be used to discover and configure the device address decoder.

There are a number of ways in which the device address decoder may be configured to store the information required to determine which device amongst the first plurality of devices any particular request is directed to. However, in one example arrangement the device address decoder is provided with an extended capability structure comprising a plurality of registers in which configuration information is stored under control of the software executed on the processing circuitry to enable the device address decoder to determine which device amongst the first plurality of devices the request is directed to. This can provide an efficient mechanism for capturing the required information as to how the pool of addresses has been allocated amongst the first plurality of devices.

In one particular example, the extended capability structure is a Designated Vendor-Specific Extended Capability (DVSEC) structure having a header field used to identify the associated device as being the device address decoder. DVSEC is an optional Extended Capability that is permitted to be implemented by a PCI express function, allowing PCI express component vendors to use the Extended Capability mechanism to expose vendor-specific registers that can be present in components by a variety of vendors. Through use of the header field, a particular form of DVSEC structure can be provided for the device address decoder. It has been found that the use of the DVSEC structure provides a particularly efficient mechanism for capturing the required information about how the pool of addressees is allocated between the various first devices in the hierarchical structure of the network.

The DVSEC structure can take a variety of forms, but in one example includes a number field to identify the number of devices in the first plurality of devices. Further, in one example arrangement the DVSEC structure comprises memory related registers associated with each device in the first plurality of devices, which are programmed under control of the software executing on the processing circuitry to contain address information identifying which addresses within the pool are allocated to the associated device in the first plurality of devices. Hence, within the DVSEC structure, separate memory related registers can be maintained for each device in the first plurality of devices, with those registers being programmable under software control during the enumeration process.

The address space defined by the pool of addresses can be arranged in a variety of ways, but in one example is formed from a plurality of address space granules, and the address information programmed into the memory related registers of the DVSEC structure identifies which address space granules are allocated to each device in the first plurality of devices.

Within such an arrangement, for each device in the first plurality of devices, the memory related registers in the DVSEC structure may store a number of vectors used to identify which address space granules are allocated to the device. The address space granules allocated to any particular device do not need to be contiguous, and accordingly there is a great deal of flexibility as to how the granules are allocated. Further, it may be that at any particular point in time one or more of the address space granules are not allocated to any device.

In one example arrangement, the memory related registers in the DVSEC structure may further identify a base address for each device in the first plurality of devices, and a size of the address space granules. Hence, whilst in some implementations all of the devices in the first plurality of devices may be given the same base address, hence identifying a common point within the pool of memory addresses, this is not a requirement and in different implementations different base addresses can be allocated to different first devices, to identify different points within the pool that serve as a starting address for those first plurality of devices.

Further, whilst each of the devices may be allocated address space granules of the same size, this is also not a requirement, and accordingly different size granules can be allocated to different devices. Due to the centralised way in which the device address decoder is discovered and configured during the enumeration mechanism, the software executing on the processing circuitry to perform the configuration can ensure that the address space granules allocated to any particular first device are non-overlapping with the address space granules allocated to any other device.

The memory related registers in the DVSEC structure can be organised in a variety of ways. However, in one example implementation, each device in the first plurality of devices also comprises memory related registers which are programmed under control of the software executing on the processing circuitry to contain address information identifying which addresses within the pool are allocated to that device. In such an implementation, the software may be arranged to program the memory related registers for each device within the DVSEC structure of the device address decoder so as to maintain the same address information as stored within the memory related registers of the individual devices in the first plurality of devices. Hence, in such an arrangement, the same values can be programmed into both the memory related registers of a particular device within the first plurality of devices, and the corresponding memory related registers within the DVSEC structure of the device address decoder. This minimises the overhead involved in configuring the device address decoder during the enumeration process.

The first plurality of devices can take a variety of forms, and in one implementation may comprise a plurality of PCIe root port devices. Whilst in one implementation all of the devices in the first plurality may be PCIe root port devices, in an alternative implementation one or more of the first plurality of devices may take another form, and hence for example the first plurality of devices may further comprise one or more integrated endpoint devices.

The pool of addresses can take a variety of forms, but in one implementation the pool of address is a memory mapped I/O (MMIO) region of the system address space.

Whilst the pool of addresses may comprise a single pool, in one implementation the pool of addresses comprises an upper pool and a lower pool. In particular, the lower pool may be within a first region of the system address space addressable using a number of address bits insufficient to identify addresses within the upper pool. By such an approach, it is possible to provide compatibility with legacy systems that use a reduced address space. In one specific example, such legacy systems may only be able to utilise addresses up to a 4 GB boundary within the system address space, and accordingly the lower pool may be allocated within such a system address space below the 4 GB boundary, whilst the upper pool may be allocated above the 4 GB boundary.

Particular examples will now be described with reference to the Figures.

The techniques described herein can be employed in association with any network of devices where the device communication protocol utilised provides an enumeration mechanism to enable software to discover and configure the devices within the network. For the purposes of the following discussion, the PCIe protocol will be considered.

FIG. 1 is a diagram schematically illustrating a problem that can arise when seeking to reserve sufficient system address space for the devices within a PCIe network, in order to support hot plug and/or hot swap activities in relation to the devices forming the PCIe network. FIG. 1 shows a system 10 comprising a plurality of processing elements, such as processor cores 15, 20, that are coupled via an interconnect 25 to a network of devices. The network of devices is arranged in a hierarchical structure, and an upper level of the hierarchical structure comprises a number of root port devices 30, 35 that are connected to the interconnect 25, with various other devices then being connected through those root ports to the interconnect 25. The other devices are collectively illustrated by the boxes 40, 45.

Whilst some of the devices of the device network may be provided on-chip, other devices may be provided off-chip. For example, a system-on-chip (SoC) may be provided that incorporates the processor cores 15, 20, the interconnect 25 and at least the upper level of the device network formed by the root ports 30, 35. However, other levels of the hierarchical structure of the device network may be provided off-chip, and accordingly the devices 40, 45 may be off-chip.

The device network can take a variety of forms, but as discussed earlier for the purposes of the present discussion it will be assumed that the device network is a PCIe network. The various devices within the device network are treated as memory mapped I/O (MMIO) devices, and are allocated MMIO regions of memory within the system address space 50. When allocating memory address space to the upper level devices in the device network, such as the root ports 30, 35, it is desirable to allocate sufficient space to enable addresses to be allocated to the various devices connected to those root ports within the device network, taking into account the memory requirements of those various devices. It is often the case that this is not known at the time the address space is initially allocated, which may for example occur at boot time of the system. However, if insufficient space is allocated, then this can lead to enumeration failures in due course, for example when an additional device is connected to a particular root port, but there is insufficient space allocated to that root port to accommodate the memory requirements of that additional device. In that event, it can be necessary to perform an invasive rebalancing process, during which time the memory space may need to be reallocated amongst potentially all of the devices in the network. This can have a very significant performance impact.

As shown in FIG. 1, in order to seek to alleviate the potential need for such enumeration failures and rebalancing, then in accordance with a known technique regions of the memory address space can be allocated to each of the root ports, with the amount of memory allocated being chosen conservatively so as to seek to accommodate for the worst case scenarios as to the number, and memory requirements, of the devices lower in the device hierarchy. Hence, for each root port 30, 35, a separate, conservatively sized, region 55, 60 within the system address space 50 may be allocated.

Further, it is often the case that different address regions need to be allocated in different parts of the system address space. For example, to maintain backwards compatibility with components that may only use a reduced number of bits to specify addresses, for example 32-bit addressing where the maximum address is 4 GB, then separate regions 65, 70 may also need to be allocated for each root port in that lower system address space. The requirement to allocate separate regions to each root port can give rise to particularly acute address space pressure within that lower address space, due to the relatively small amount of space available.

Figure 2:
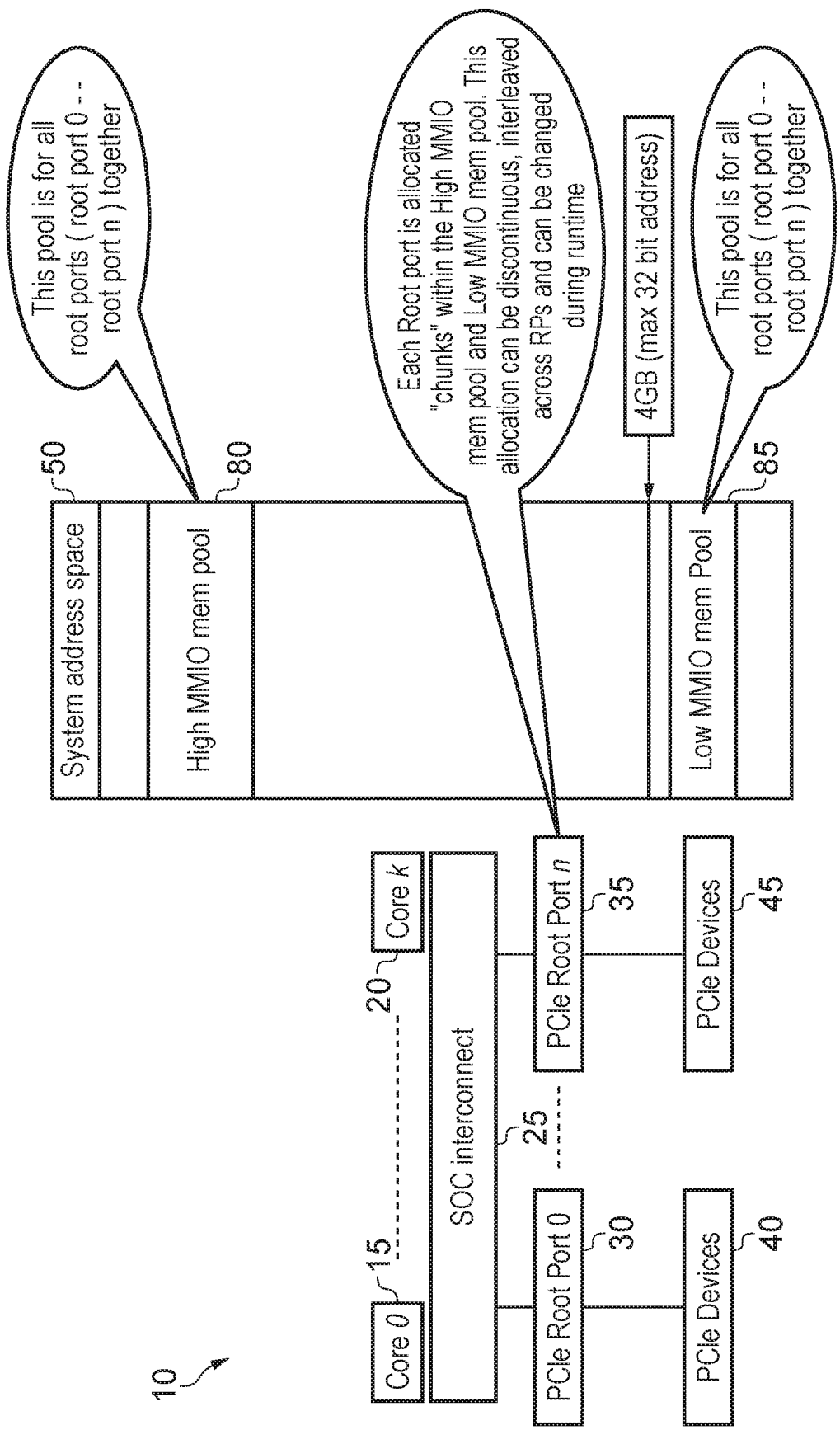
FIG. 2 illustrates a Flattening Portal Bridge (FPB) form of address decoding that can be utilised within a SoC implementation, in combination with SoC level support, to enable dynamic reallocation of regions within an address pool amongst multiple different root port devices, in accordance with one example arrangement.

FIG. 2 schematically illustrates how the system address space may more optimally be utilised, in situations where the FPB mechanism is enabled and SoC level support is provided. In particular, as will be apparent from a comparison of FIG. 2 with the earlier discussed FIG. 1, a single address pool may be reserved for use in association with all of the root port devices 30, 35, rather than having to reserve separate system address spaces for each root port. In the particular example shown, there are separate memory pools allocated above and below the 4 Gigabyte (GB) address boundary, and accordingly there is a single high MMIO memory pool 80 and a single low MMIO memory pool 85 allocated for use in association with the root ports 30, 35 (and indeed any other devices forming the highest level of the device network, i.e. the components directly connected to the interconnect 25). Each of the memory address pools 80, 85 can be broken down into chunks that can be allocated to individual root ports, herein theses chunks also being referred to as address space granules. The size of the granules allocated to each root port need not be the same, and the individual granules allocated to a particular root port do not need to be contiguous. However, each granule formed within the memory pool will only be allocated to one of the root ports, and accordingly the addresses used by the individual root ports are kept separate from one another.

Whilst the earlier discussed FPB scheme introduces the concept of maintaining memory pools for allocation to bridge devices, the earlier-mentioned FPB paper published by PCI-SIG acknowledges that new software and hardware will need to be developed, and in particular SoC level support for FPB address decoding will be required if significant benefits are going to be achieved using the FPB scheme to control how address space is allocated between different root ports.

The techniques described herein provide SoC level support to enable dynamic allocation and deallocation across the first level devices (such as the root ports), hence enabling memory allocations to be moved between such devices. This significantly enhances existing FPB functionality, which only determines whether an address is mapped to a point downstream of the bridge/root port or not. The existing FPB mechanism does not explicitly do any routing, based on current allocations, from one bridge/root port to another. However, through the SoC level enhancements described herein, it is possible to perform explicit routing, based on the current allocations, to the correct root port.

In particular, the techniques described hereafter provide standardised SoC level support for using the FPB address decoding mechanism, enabling system software to use well-known PCIe methods to support the dynamic reallocation of address space within the pools amongst the various PCIe root ports. In particular, as will be discussed in more detail with reference to the remaining figures, an address decoding component can be provided at the SoC level, for example within the SoC interconnect, which is exposed to the software run on the SoC to enumerate the PCI device network so that that address decoding component is viewed as a device of the device network for the purposes of enumeration and configuration. As a result, that address decoding component can be discovered and configured using the standard PCIe enumeration mechanism, which provides a particularly efficient, effective, and standardised mechanism for enabling the allocation of the pool of addresses amongst the devices of the network to be dynamically reconfigured under software control.

Figure 3:
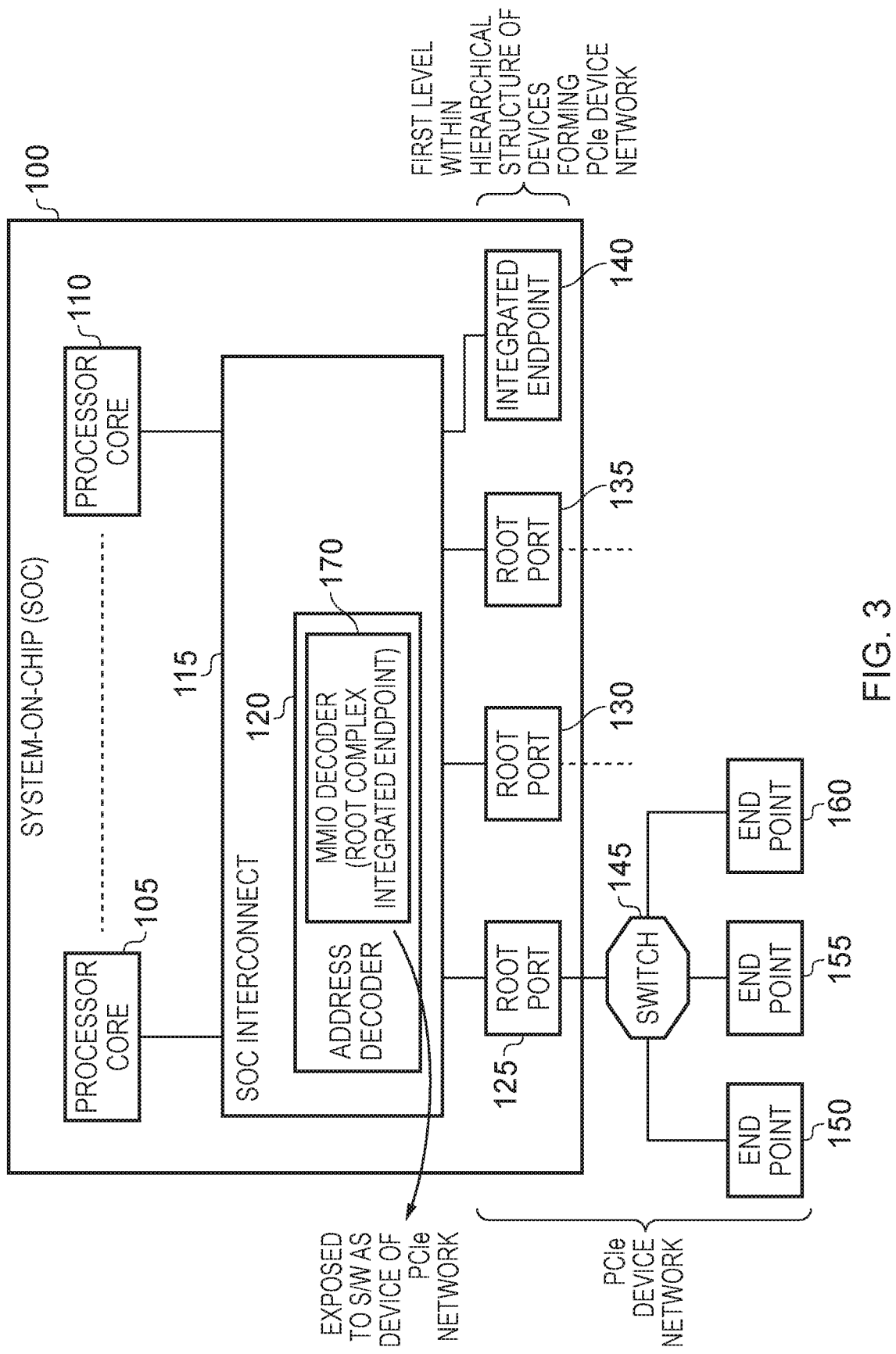
FIG. 3 is a block diagram illustrating a SoC in accordance with one example arrangement.

This is illustrated further in the block diagram of FIG. 3. In this example, a SoC 100 is provided having a number of processor cores 105, 110 connected to an interconnect 115. A PCIe device network is also provided as shown in FIG. 3, with a first level within the hierarchical structure of that device network comprising a number of components 125, 130, 135, 140 that are connected to the interconnect 115, and which are considered to be part of the SoC 100. As shown in FIG. 3, these will typically comprise a number of root ports 125, 130, 135, but may also include one or more additional types of device, for example an integrated endpoint device 140.

As will be understood by those skilled in the art, a number of devices may be connected to the root ports forming the first level of the hierarchical structure of the device network, as shown by way of example in association with the root port 125. For example, a switch device 145 may be provided that is connected to the root port 125, and which is also connected to a number of endpoint devices 150, 155, 160. It will be appreciated that in practice the device network may have a number of different hierarchical levels, and take a variety of different forms, and the use of the switch 145 and endpoints 150, 155, 160 in FIG. 3 is provided purely for the sake of illustration.

In association with the interconnect 115, an address decoder 120 may be provided which is responsive to requests received at the interconnect, to determine the appropriate recipient for those requests. Accordingly, by way of example, a processor core may issue a request specifying an address, and the address decoder 120 can be used to determine how to route that request through the interconnect to the appropriate recipient device. Whilst in FIG. 3, the address decoder 120 is shown schematically as being part of the interconnect 115, in alternative implementations the address decoder may be at least partly external to the interconnect, for example may be partly provided by functionality within one or more of the processor cores 105, 110.

From the earlier discussions, it will be appreciated that the devices within the PCIe network are allocated addresses within MMIO address regions, and in accordance with the FPB scheme one or more memory pools may be allocated for use in association with those devices, for example the high memory pool 80 and low memory pool 85 shown in FIG. 2. Considering the first level within the hierarchical structure comprised of the components 125, 130, 135, 140, individual address space granules within a memory pool can be allocated to particular ones of those devices 125, 130, 135, 140.

To enable the efficient utilisation of address space as facilitated by the use of such memory pools, it is desirable to provide a system level mechanism for efficiently enabling address space granules within the memory pools to be reallocated between the different first level devices within the PCIe network. For example, considering root port 125, a sufficient quantity of address space needs to be allocated to that root port to support addressing of each of the individual components within the PCIe network that are coupled to the interconnect via that root port. Hence, for example, each of the endpoint devices 150, 155, 160 will need to be allocated sufficient address space using the address space granules that are allocated for the root port 125. Further, activities such as hot plug and hot swap activities may result in changes to the configuration of the PCIe network, for example changing the number of devices connected to particular root ports, and potentially affecting the memory requirements that need to be supported by any individual root port.

When using the earlier discussed FPB mechanism, it would be highly desirable to provide SoC level support for reallocation of address space granules between the various root ports and/or other components forming the first level within the hierarchical structure of devices of the PCIe device network. The aim of providing such SoC level support is to efficiently enable reallocation of address space amongst those devices so that wherever possible the required changes can be accommodated without having to perform an invasive rebalancing mechanism, which could otherwise involve changing the address space mapping for a significant number, and potentially all, of the devices within the network.

In accordance with the techniques described herein, the address decoder 120 includes an MMIO decoder (also referred to herein as a device address decoder), which is exposed to software as a device of the PCIe network. In particular, the software (which may include firmware) that may be executed on one of the processor cores 105, 110 during an enumeration process to discover and configure the PCIe device network is able to see the MMIO decoder as a device of the PCIe network. Hence, even though it is not a device that is formally provided as part of the PCIe device network, it can be viewed as such by the above-mentioned software executing on the processor core, and as such can be discovered and configured using standard PCIe enumeration techniques.

The MMIO decoder 170 can be constructed in a variety of ways, but in one particular implementation is formed as a root complex integrated endpoint. By arranging the MMIO decoder 170 as a root complex device that is an integrated endpoint, i.e. an endpoint of the PCIe network within the SoC 100, this provides a simple mechanism for the software executing on the processor to see the MMIO decoder as an enumerable device. In particular, the MMIO decoder can in such an arrangement have its own root bus to the software running on the processor and as a result the MMIO decoder endpoint will have its own ECAM (Enhanced Configuration Access Mechanism) region, its own ECAM base and its own root bus number. This ensures that standard PCIe methods can be used to enumerate and configure the MMIO decoder 170.

Figure 4:
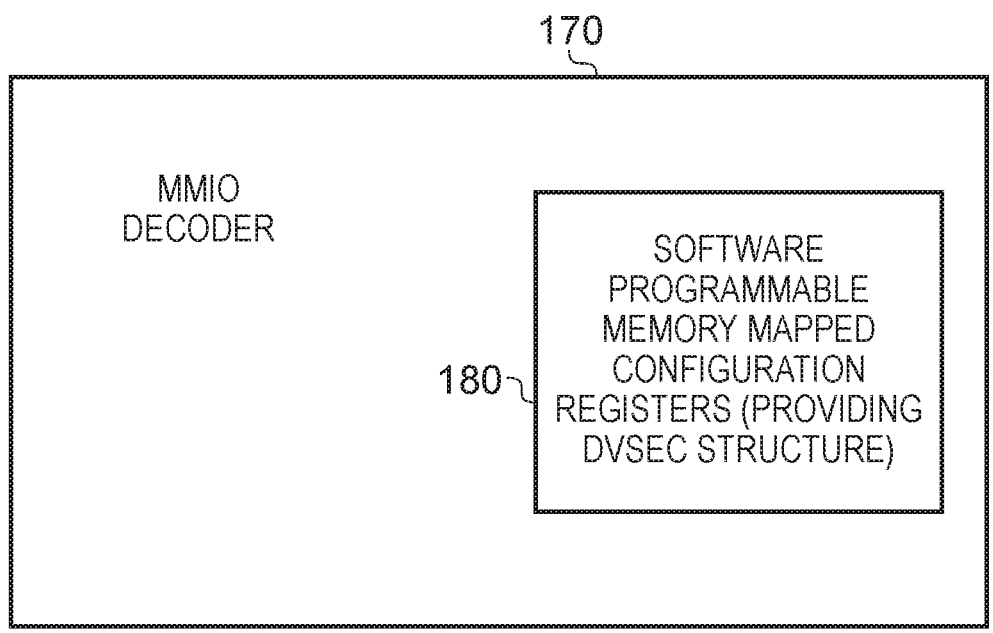
FIG. 4 schematically illustrates the MMIO decoder of FIG. 3 in accordance with one arrangement.

FIG. 4 illustrates the MMIO decoder 170 in more detail. In particular, the MMIO decoder will include some software programmable memory mapped configuration registers 180 that can be programmed during a standard PCIe enumeration process in order to provide sufficient information to identify how the upper and lower memory pools 80, 85 have been allocated amongst the various devices 125, 130, 135, 140 forming the first level within the hierarchical structure of the PCIe network. The particular form of the configuration registers will be discussed in more detail later with reference to FIG. 8, but in general terms the configuration registers 180 can replicate some of the information maintained within the individual configuration register of the devices 125, 130, 135, 140, so as to provide information as to how the various address space granules within the memory pools 80, 85 have been allocated. Since the configuration registers 180 are accessible and reprogrammable during an enumeration process, they can be reprogrammed in response to hot plug and hot swap events so as to seek to adjust how the memory pool resources are allocated amongst the various devices 125, 130, 135, 140 to accommodate for the changing memory requirements within the PCIe network without needing to perform a full rebalancing process.

Figure 5:
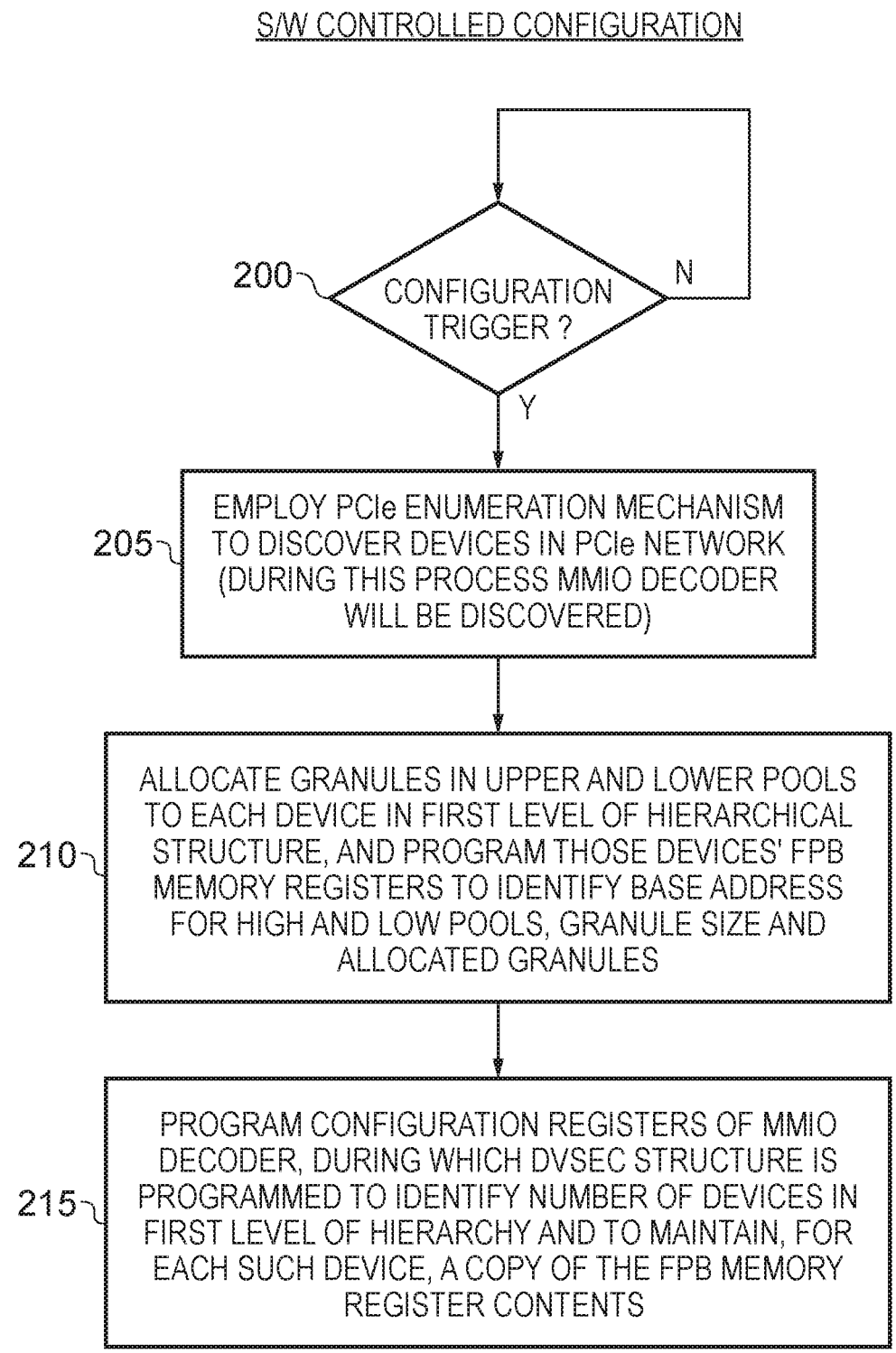
FIG. 5 is a flow diagram illustrating a software controlled configuration process that can be used in accordance with one example arrangement to discover and configure the devices of a device network, during which process the MMIO decoder is also discovered and configured.

FIG. 5 is a flow diagram illustrating a software controlled configuration process that may be implemented within the system of FIG. 3, causing the MMIO decoder 170 to be discovered and configured during the software configuration of the PCIe device network. At step 200, a configuration trigger is awaited. This could for example occur at boot time, when the system is first switched on, but additional configuration triggers could also occur dynamically during use.

Upon occurrence of the configuration trigger, then at step 205 software executing on the processor core 105 (which may for example take the form of operating system software and/or boot firmware) is used to employ a PCIe enumeration mechanism to seek to discover the devices currently present in the PCIe network. During this process the MMIO decoder 170 will also be discovered, since as mentioned earlier this is exposed to the software as a device of the PCIe network. During the enumeration process, the MMIO requirements for all the devices below the root port will be discovered. This would be used by the software to decide on the granule allocation to each root port, and for the programming of the FPB decoders in each root port.

At step 210 granules in the upper and lower pools 80, 85 are allocating to each device in the first level of the hierarchical structure of the PCIe network, i.e. to the devices 125, 130, 135, 140 for the specific example case of FIG. 3, to take account of the memory requirements of those devices and any devices lower in the hierarchy that are coupled to them. Configuration registers within each of those devices are then programmed based on how the granules have been allocated. In particular, for each such device, that device's configuration registers are programmed to identify the particular granules within the upper and lower pools 80, 85 that have been allocated to it. Those configuration registers can take a variety of forms, but in one implementation are FPB memory registers that are programmed to provide specific information used to identify the allocated granules. This information can include a base address for the high and low pools that is used by that particular device, a granule size used to identify the size of the individual granules within the memory pools that have been allocated, and information to identify the particular allocated granules (for example by specifying one or more vectors that are interpreted with reference to the base address information and the granule size).

Whilst not specifically mentioned in step 210, this same process is used to allocate addresses to the other devices at the lower level in the hierarchical structure, these devices also including configuration registers that are programmed by the software during step 210. Hence, considering by way of example the root port 125, whilst its FPB memory registers will be programmed to identify the particular granules allocated to that root port, the configuration registers associated with the lower devices in the hierarchical structure will also identify the particular addresses allocated to those lower devices from amongst the granules allocated to the root port 125.

As shown at step 215, configuration registers 180 within the MMIO decoder 170 are also programmed during the software configuration process in order to identify how the address space has been allocated to the devices 125, 130, 135, 140 forming the first level within the hierarchical structure of the PCIe network. The configuration registers 180 can take a variety of forms, but in one example case discussed hereafter will include a Designated Vendor-Specific Extended Capability (DVSEC) structure that is programmed to identify the number of devices in the first level of the hierarchy (so for the particular example of FIG. 3 this will identify that there are 4 devices) and to maintain, for each such device, a copy of the FPB memory register contents programmed into each such device. This provides a very efficient mechanism for the MMIO decoder 170 to retain information about how the various address space granules within the memory pool 80, 85 have been allocated amongst the devices 125, 130, 135, 140.

In FIG. 5, it is assumed that each of the devices at the first level within the hierarchical structure have the FPB mechanism enabled. However, this is not a requirement, and individual devices can have the FPB mechanism disabled, in which event, they are excluded from the pooling mechanism illustrated in FIG. 2, and are instead allocated their own address space above and below the 4 GB boundary.

As will be apparent from FIG. 5, since the MMIO decoder is exposed as a device of the PCIe network, it can be discovered and configured using standard PCIe enumeration techniques, so that its configuration registers retain sufficient information to know how the MMIO address space within the various pools has been allocated amongst the devices at the upper hierarchical level in the PCIe network. This provides a very efficient and effective mechanism for capturing this information at the SoC level, to provide SoC level support for address decoding when using the FPB address decoding mechanism. Further, it provides a very efficient mechanism for dynamically adjusting how the address space granules are allocated amongst the various devices at the first level within the hierarchical structure of the PCIe network, for example in response to hot plug or hot swap events.

In particular, when such an event occurs, this will trigger an interrupt that causes the relevant processor core used to manage the PCIe network enumeration process to re-perform enumeration to the extent necessary to gain sufficient information about the hot plug or hot swap event. Hence, if a new device is inserted, it can discover that device, identify which root port it is connected to, and identify the memory requirements of that device. It can then seek to redistribute address granules within the pools as required so as to seek to provide sufficient memory space through the relevant root port to enable that new device to be addressed without needing to perform an invasive rebalancing that could otherwise affect how other devices are addressed. In particular, if there are any unallocated granules within the pools, or if there are unused granules amongst those that have been allocated, then those granules can be freed up for allocating to the relevant root port for use in association with the new device. A similar mechanism can also be invoked for hot swap functions, and further when a device is removed, a similar enumeration process can be used to identify granules that have been freed up as a result, so that those granules are available for reallocation.

Since the MMIO decoder is exposed as a device of the PCIe network, it is straightforward for the software to reprogram the relevant configuration registers within the MMIO decoder during the above-described enumeration process, so as to keep an up-to-date record within the MMIO decoder 170 as to how the address space granules within the upper and lower pools have been allocated.

Figure 6:
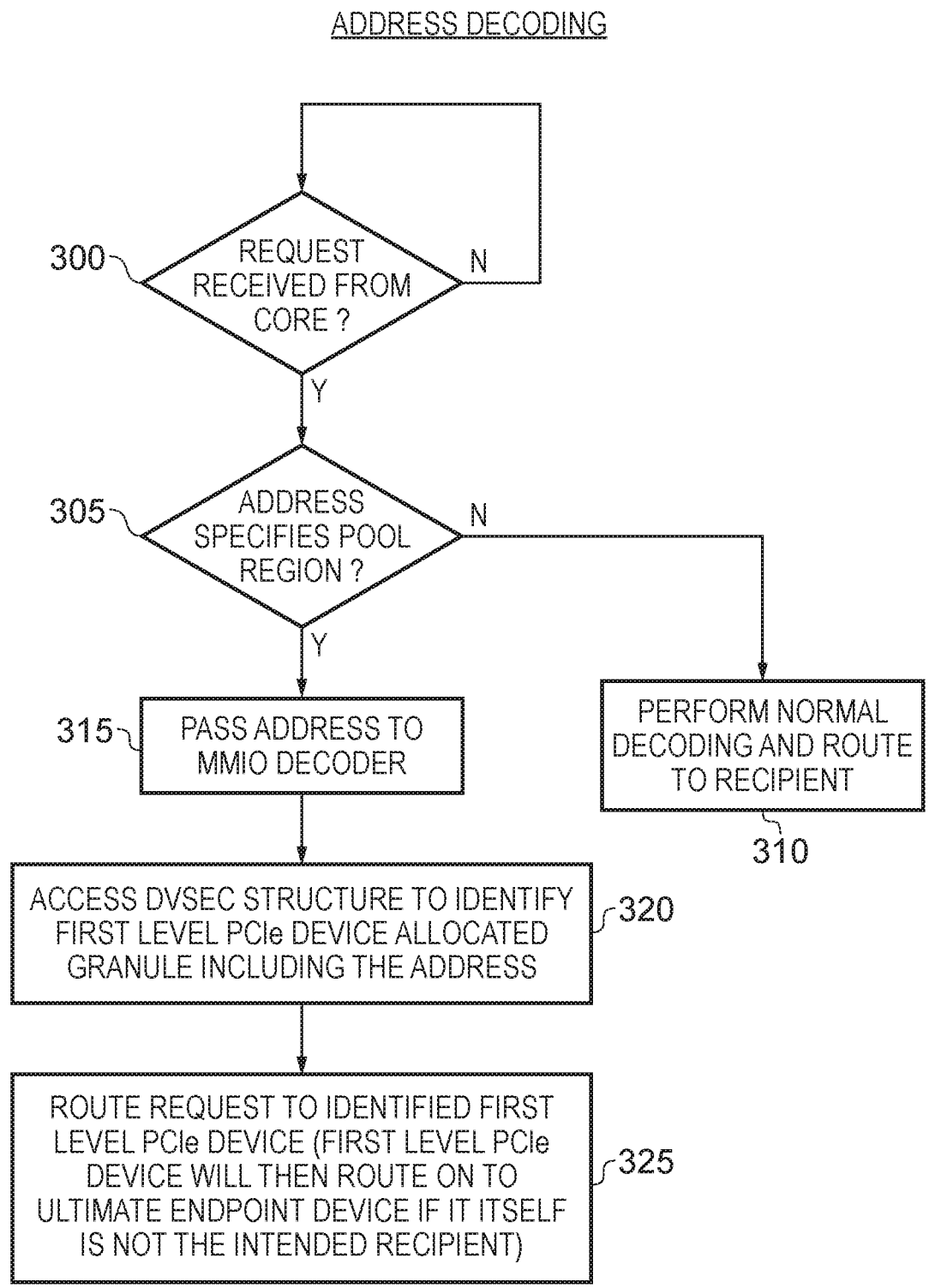
FIG. 6 is a flow diagram illustrating an address decoding operation performed in one example arrangement.

FIG. 6 is a flow diagram of an address decoding process that may be employed by the address decoder 120 of FIG. 3. At step 300, it is determined whether a request has been received from one of the processor cores 105, 110, such a request specifying an address within the system address space that is associated with that request. Once a request has been received, then it is determined at step 305 whether the address specifies a pool region within the system address space, and in particular whether it is an address within the high MMIO pool 80 or an address within the low MMIO memory pool 85. If not, then at step 310 the address is decoded in a standard manner and routed to the recipient, and in particular the MMIO decoder 170 is not required in that instance.

However, if it is determined at step 305 that the address does specify either the upper or lower pool region, then the process proceeds to step 315 where the address is passed to the MMIO decoder 170 for analysis. At step 320, the MMIO decoder accesses its configuration register 180, and in particular the registers maintaining the DVSEC structure mentioned earlier, in order to seek to identify the first level PCIe device 125, 130, 135, 140 that has been allocated the granule including the address in question. If the address does not map to any allocated granule, then an error will be flagged, but for the purposes of the discussion in FIG. 6 it is assumed that the address does map to one of the allocated granules. Accordingly, the process then proceeds to step 325 where the request is routed to the identified first level PCIe device, i.e. the device having an allocated granule that includes the address in question. In accordance with standard PCIe mechanisms, that first level device will then route the request on to the ultimate endpoint device if it itself is not the intended recipient. Hence, considering FIG. 3, the request may be routed through the root port 125 and via the switch 145 to an appropriate one of the endpoints 150, 155, 160, the appropriate endpoint being determined with reference to the address.

Using the techniques described above, it is possible for fine grain allocation of the low MMIO memory pool 85 and high MMIO memory pool 80 to different root ports, with non-contiguous, interleaved allocation if desired. Further, by providing an MMIO decoder at the SoC level that is exposed to software as a device of the PCIe network, it is possible to maintain the allocation information at the SoC level, and for changes in the allocation to be readily adopted during standard device enumeration techniques.

Figure 7:
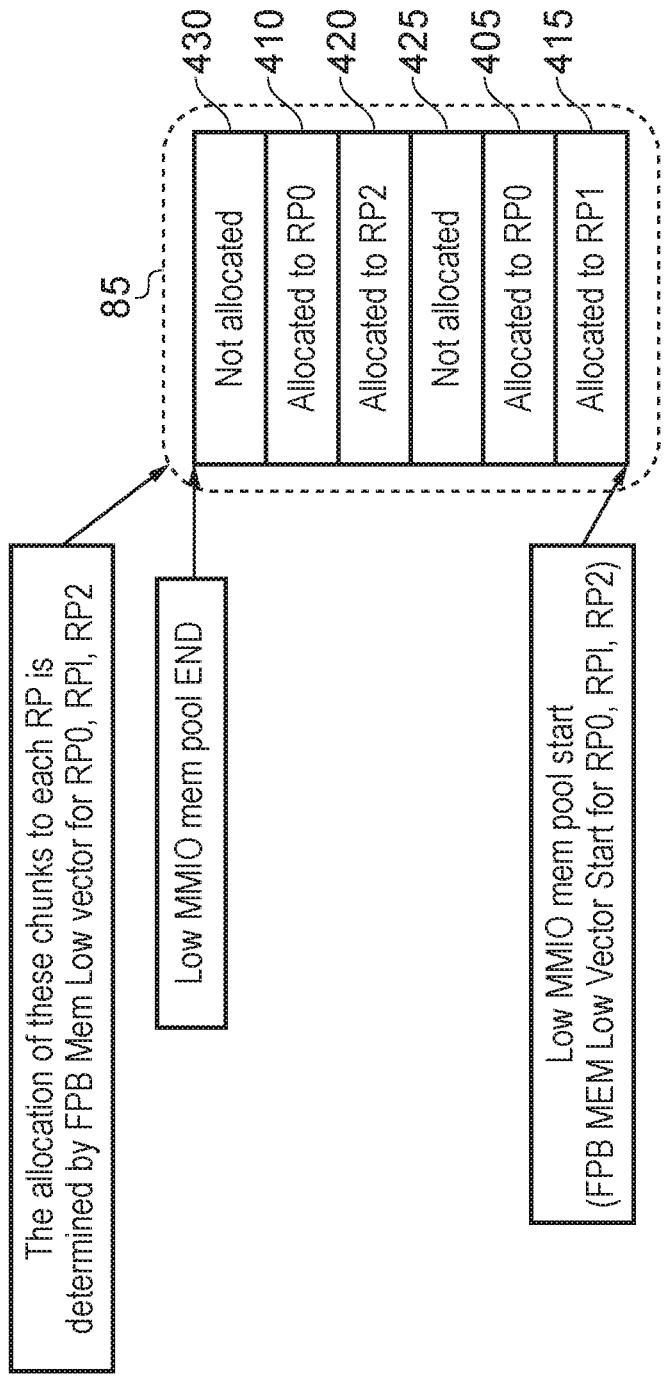
FIG. 7 schematically illustrates how a memory pool can be allocated amongst multiple root ports in accordance with the techniques described herein.

FIG. 7 illustrates an interleaved allocation of granules for an example use case, considering in particular the low MMIO memory pool 85. In accordance with the FPB scheme, a number of vector registers are defined to identify how the low and high MMIO memory pools are allocated to individual devices. As shown in the example of FIG. 7, the memory pool is divided into 6 chunks (also referred to herein as address space granules), and in this example it is assumed that there are 3 root ports, namely RP0, RP1 and RP2. As shown in this illustrative example, the chunk 405 is allocated to root port 0, as is the non-contiguous chunk 410. The chunk 415 is allocated to root port 1 and the chunk 420 is allocated to root port 2. Currently the chunks 425 and 430 are not allocated to any root port. It will be appreciated that FIG. 7 illustrates a simplistic example, and in other examples there could be more or less chunks provided, and more or less root ports (and optionally other devices such as integrated endpoint 140 that may also be allocated one or more chunks within the memory pool).

In accordance with the FPB scheme, a number of vector registers can be provided within the configuration registers of a root port to identify any chunks within the low MMIO memory pool and high MMIO memory pool that have been allocated to that device. Considering the low MMIO memory pool, a low vector control register can be used for this purpose, and accordingly the allocation of the chunks to each root port can be determined from a review of the low vector control registers for each of the root ports. One piece of information maintained within the low vector control register is a low vector start, also referred to herein as a base address. In the example shown in FIG. 7, it is assumed that the base address identified in the vector start information of each low vector control register is the same, and points to the initial entry within the low MMIO memory pool. However, it is not essential that the vector start is the same for each of the root ports, and in some implementations the vector start can be specified differently for different root ports, so as to identify a starting point that can be used to interpret, from other information specified in the configuration registers, which chunks have been allocated. Further, the chunk or granule size does not need to be the same for each of the root ports, and the low vector control register can also capture information about the granule size.

Figure 8:
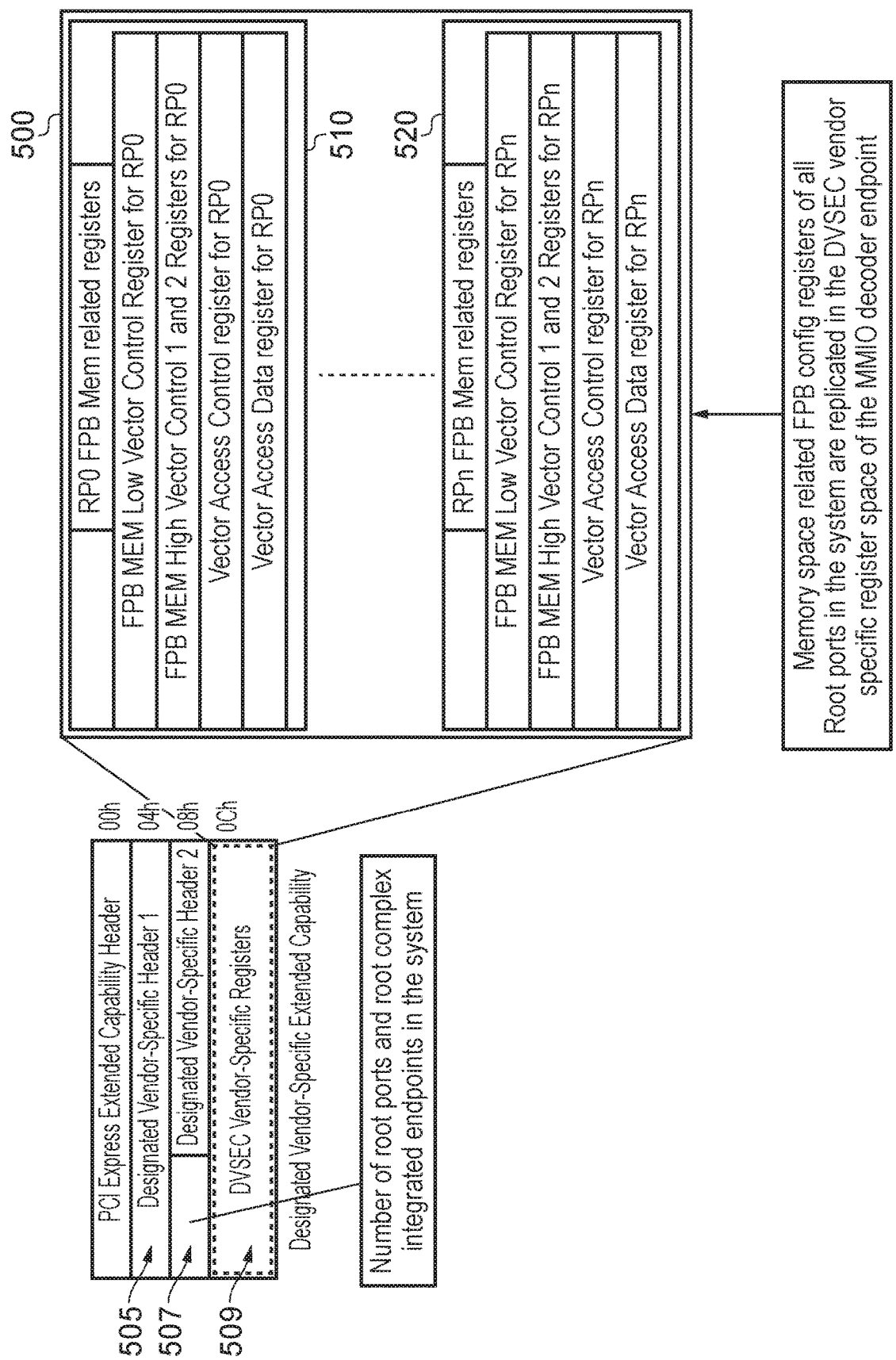
FIG. 8 illustrates a Designated Vendor-Specific Extended Capability (DVSEC) structure that may be employed within the software programmable memory mapped configuration registers of the MMIO decoder, in accordance with one example arrangement.

As mentioned earlier, the software programmable memory mapped configuration registers 180 of the MMIO decoder 170 incorporate a DVSEC structure which is illustrated by way of example in FIG. 8. The underlying DVSEC structure is illustrated in the top left hand side of the figure and incorporates some fields required for the DVSEC structure, the DVSEC structure being a structure whose basic form is defined by PCI-SIG. In accordance with the techniques described herein, the designated vendor-specific header 1 505 can be used to identify that the DVSEC structure is defining an MMIO decoder. The field 507 can then be used to capture information about the number of root ports in the system, or more particularly the number of first level devices within the hierarchical structure. Whilst these may predominantly be root ports, as discussed earlier with reference to FIG. 3 other devices could also be provided at the first level, such as the integrated endpoint 140, and hence with regards to the example of FIG. 3 the field 507 will identify that there are 4 devices at the first level within the hierarchical structure.

As will be apparent from FIG. 8, part of the DVSEC structure specifies DVSEC vendor-specific registers 509, and for a DVSEC associated with the MMIO decoder, these registers are used to capture the information shown in the expanded box 500. In particular, as shown, there are a set of FPB memory related registers for each of the root ports, or more generally for each of the first level devices within the hierarchical structure. These memory related registers comprise a series of vector registers that are effectively a copy of the information maintained in the relevant configuration registers of each first level device. In particular, within a root port, the FPB mechanism defines a series of vector registers that are programmed to identify the memory space granules allocated to that root port device. Those registers include the various low vector and high vector control registers illustrated in FIG. 8, and access control and access data registers. Within the individual root port devices, these various registers capture information about a base address, a granule size, and vector information enabling the individual granules allocated to the associated root port device to be identified. The earlier-mentioned PCI-SIG Engineering Change Notice on the Flattening Portal Bridge (FPB) sets out in detail the information provided in each of these registers.

As shown in FIG. 8, within the DVSEC structure provided in the MMIO decoder 170, a set of memory related registers 510, 520 are provided for each first level device, and effectively replicate the information that is programmed into the associated first level device itself. Since the MMIO decoder is viewed as a device of the PCIe network, it will be appreciated that the process of populating these registers is straightforward during the enumeration configuration process, and hence the population of the DVSEC structure within the MMIO decoder 170 can be readily achieved using standard enumeration techniques.

In summary, from the above discussion it will be appreciated that the DVSEC structure within the MMIO decoder ensures that the SoC level MMIO decoder has information about the number of first level devices within the PCIe network, which address granules(s) within the MMIO memory high and low pools are allocated to which first level device, and the start address of the FPB mem low and FPB mem high regions for each root port. This information can then be used to route MMIO transactions to the correct first level device within the PCIe network. Further, the system software discussed earlier will program the MMIO decoder endpoint's FPB mem related registers for each root port with the same values as programmed in the actual root port's FPB memory registers, as part of the standard configuration process.

Figure 9:
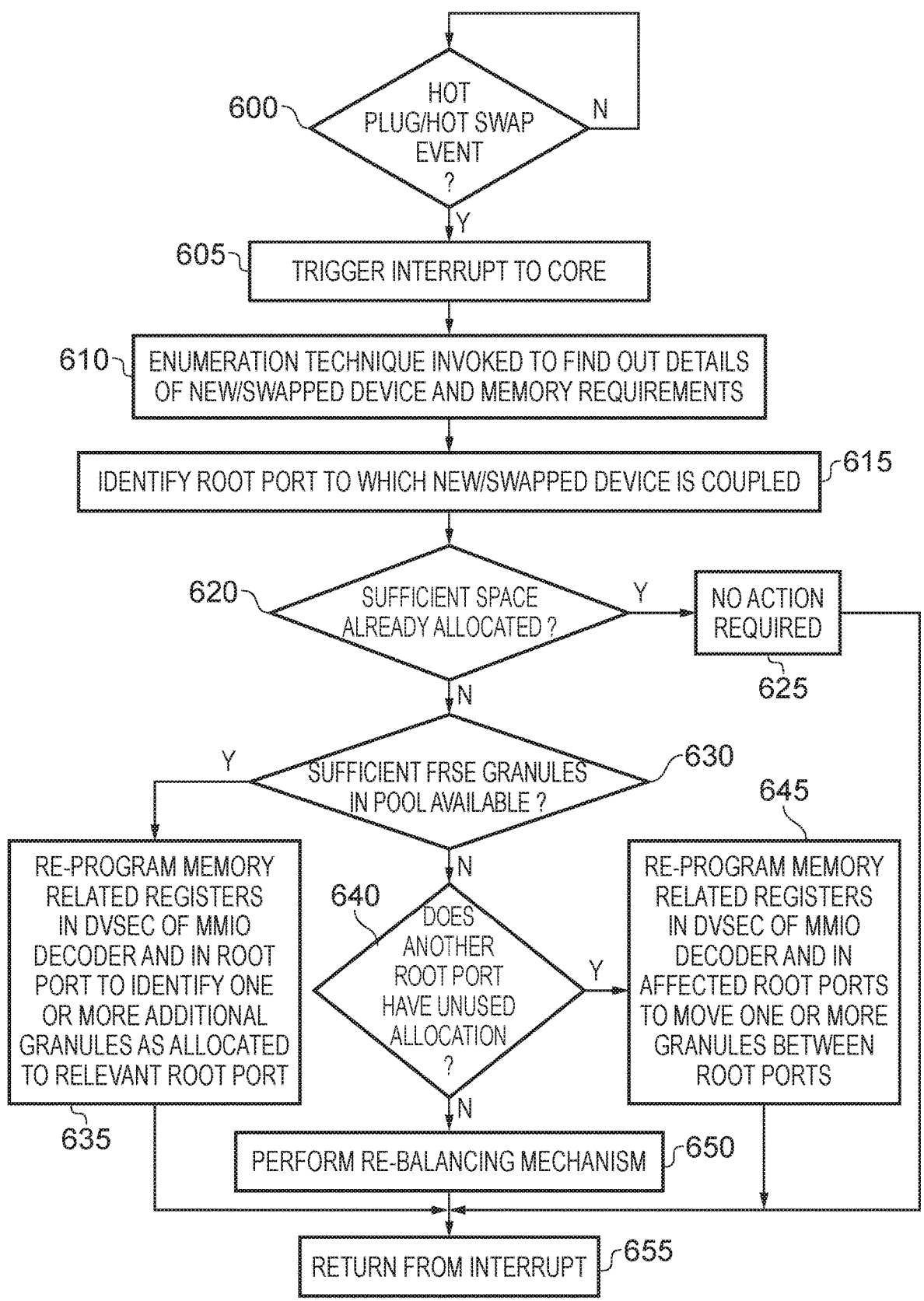
FIG. 9 is a flow diagram illustrating steps performed in response to a hot plug or hot swap event, in accordance with one example arrangement.

FIG. 9 is a flow diagram illustrating the steps that may be taken on occurrence of a hot plug/hot swap event. When such an event is detected at step 600, then an interrupt to the relevant processor core is triggered at step 605. In particular, the processor core that is used to run the software used to configure the PCIe device network will receive an interrupt at step 605.

At step 610, the enumeration technique will be invoked in order to find out details of the new or swapped device, and the memory requirements associated with that device. Further, at step 615, the root port will be identified to which the new or swapped device is coupled. Hence, considering FIG. 3, if by way of example the endpoint device 150 is being plugged into the system for the first time, it will be identified that that endpoint device 150 is associated with the root port 125.

At step 620, the software will then determine whether sufficient space has already been allocated to that root port. In particular, information will be maintained not only as to which address space granules have been allocated to that root port, but also the extent to which those granules have been utilised. If there is already sufficient space allocated to the root port to accommodate the memory requirements of the new or swapped device, then the process proceeds to step 625, where no specific action is required (other than to program the relevant configuration registers to indicate the address range allocated to the new device) and then a return from the interrupt can be performed at step 655.

However, if it is determined at step 620 that there is not sufficient space already allocated to the relevant root port, then at step 630 it can be determined if there are sufficient free granules available within the relevant memory pool. As part of the enumeration process, information about whether memory space is required above or below the 4 GB boundary will be retrieved from the new/swapped device and accordingly the relevant memory pool is known at step 630.

If there are sufficient free granules in the pool available, i.e. there are a sufficient number of granules that are not yet allocated to one of the first level devices (such as the granules 425 and 430 in the example of FIG. 7), then the process proceeds to step 635 where the memory related registers are reprogramed in both the DVSEC structure of the MMIO decoder for the relevant root port and also in the relevant root port itself, in order to identify one or more additional granules as allocated to that root port. Hence, if the relevant root port to which the new or swapped device is root port 0, then the memory related registers for root port 0 in the DVSEC of the MMIO decoder will be updated, and in addition the configuration registers within root port 0 will also be updated. After the update, the information maintained in the DVSEC structure for the root port 0 will again replicate the updated contents in root port 0 itself. The new device's configuration registers will also be programmed at this stage to identify the allocated address range for that device. Following step 635, then a return from the interrupt can be invoked at step 655.

If at step 630 it is determined that there are not sufficient free granules in the pool available, then at step 640 it is determined whether another root port has sufficient unused allocation, i.e. has been allocated one or more granules that it is not using, and which resource could be used to service the new or swapped device associated with the other root port. If this is the case, then the process proceeds to step 645 where the memory related registers in the DVSEC structure of the MMIO decoder are reprogrammed for both of the root ports (i.e. the root port associated with the new/swapped device and the root port that has sufficient unused allocation). In addition, those affected root ports are also reprogrammed so that their configuration registers are updated, as a result of which one or more granules are effectively moved between the two root ports to provide sufficient resource for the new/swapped device. Again the new/swapped device's configuration registers are also programmed at this stage. Thereafter, the process can proceed to step 655.

Only if at step 640 it is decided that another root port does not have sufficient unused allocation does the process then proceed to step 650 where a full rebalancing mechanism is performed. This may for example require an increase in the overall size of the relevant pool, and may potentially involve the remapping of a significant number of the devices within the PCIe device network. However, as will be apparent from FIG. 9, in most instances it will not be necessary to perform rebalancing, and one of the earlier described mechanisms can be used to dynamically reconfigure the available space within the memory pools so as to accommodate the hot plug or hot swap activity.

Figure 10:
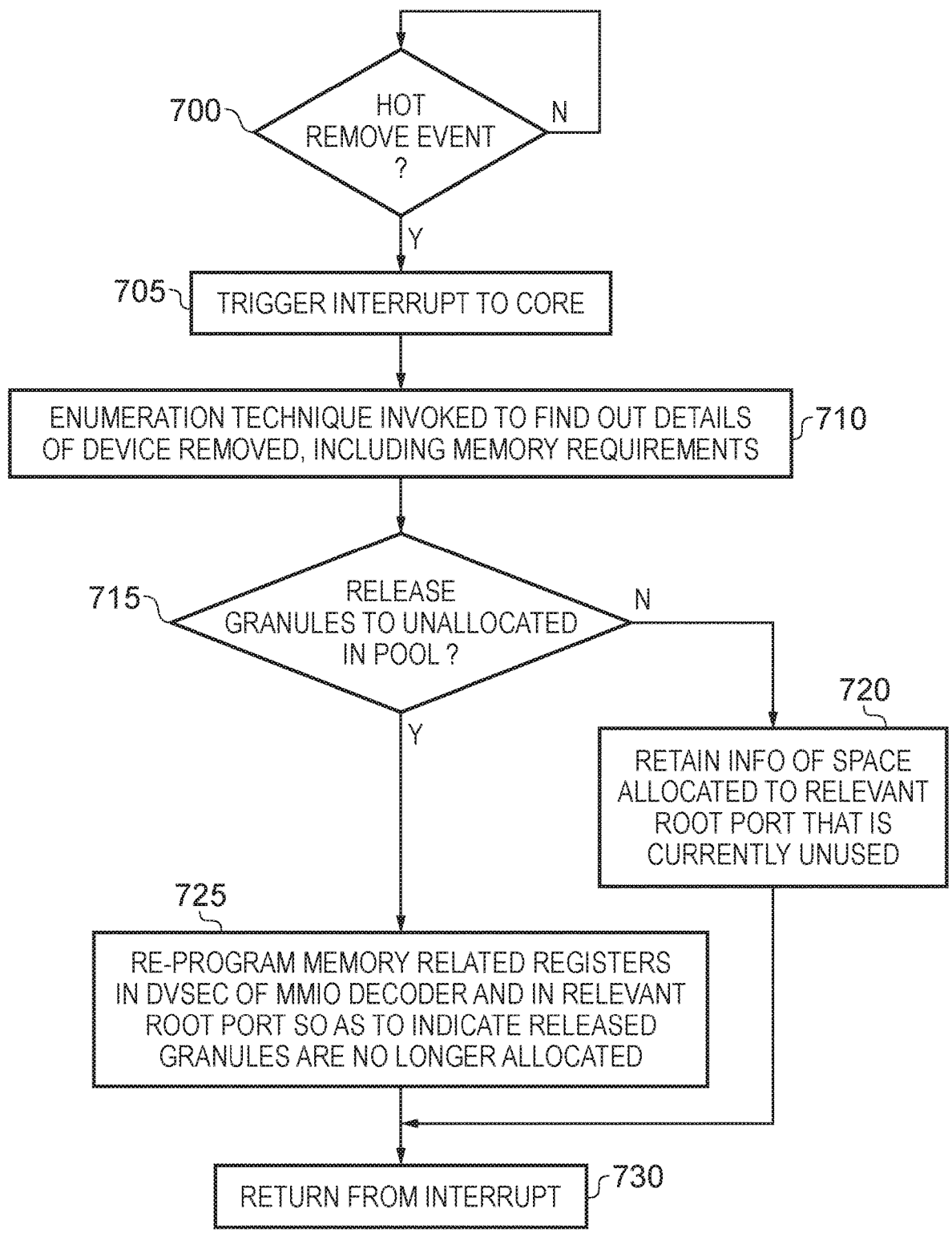
FIG. 10 is a flow diagram illustrating steps performed in response to a hot remove event, in accordance with one example arrangement.

FIG. 10 is a flow diagram illustrating the steps that can be implemented in one example configuration in the event of a hot remove event. Hence, in this instance an existing device is removed from the PCIe network. Upon occurrence of such an event at step 700, an interrupt is triggered to the relevant processor core at step 705, and then at step 710 the earlier discussed enumeration technique is invoked in order to find out details of the device removed, including that device's memory requirements. In this situation, the software already has information about the memory requirements/allocated memory granules for the removed device, as that information would have been obtained during a previous enumeration step in respect of that device.

At step 715, it is then determined whether the current mode of operation requires the granule or granules that were associated with that removed device to be released so that they then increase the total number of unallocated granules within the pool. If so, then the process proceeds to step 725 where the memory related registers in the DVSEC structure of the MMIO decoder and in the relevant root port are reprogrammed so as to indicate that the relevant granule or granules are no longer allocated to that root port. Thereafter, at step 730 a return from the interrupt takes place.

However, it is not essential that the granules be released as soon as the device has been removed, and instead the implementation may allow granules to be allocated to a root port even though they are not currently used. In that event, the process proceeds to step 720, where information is retained regarding the address space that has been allocated to the relevant root port that is currently unused. In particular, the software can track, for the relevant root port, which allocated granules are currently unused. Thereafter, the process then proceeds to step 730.

From the above described examples, it will be appreciated that such examples provide a particularly effective and standardised mechanism that can be used to provide SoC level support for FPB address decoding. In particular, by providing an MMIO decoder at the SoC level that is exposed to the relevant software as a device of the PCIe network, it is possible for the MMIO decoder to be discovered and configured using standard PCIe enumeration techniques. The MMIO decoder can be exposed as a root complex integrated endpoint on its own root bus to the software, enabling ready enumeration and configuration of the decoder. Further, in addition to mandatory PCIe capability structures, the MMIO decoder endpoint can be provided with a DVSEC structure that provides a very efficient mechanism for capturing all of the relevant information about how the high and low MMIO memory pools have been allocated amongst the various devices forming the first level within the hierarchical structure of the devices of the network. In particular, information maintained in the configuration registers of those first level devices can be directly replicated within the DVSEC structure maintained by the MMIO decoder. This provides a particularly efficient mechanism for retaining all of the required information to facilitate routing of requests amongst the devices of the PCIe network, and allows for an efficient reallocation of the various granules within the memory pools as and when required during dynamic adjustments to the configuration of the PCIe network.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A system-on-chip comprising:
processing circuitry to perform data processing operations;
a first plurality of devices;
an interconnect to couple the processing circuitry to the first plurality of devices, the first plurality of devices being a first level of devices within a hierarchical structure of devices forming a device network, where devices within the device network are arranged to communicate using a device communication protocol, the device communication protocol providing an enumeration mechanism to enable software executed on the processing circuitry to discover and configure the devices within the network of devices; and
an address decoder to decode an address specified by a request issued by the processing circuitry in order to determine a recipient for the request;
within a system address space a pool of addresses being reserved for allocation to the first plurality of devices, and the address decoder comprising a device address decoder to maintain, for each device in the first plurality of devices, an indication of which addresses within the pool are allocated to that device;
wherein the address decoder is responsive to detecting that the address specified by the request is within the pool of addresses, to employ the device address decoder to determine which device among the first plurality of devices the request is directed to and to cause the request to be routed to the determined device within said first plurality;
wherein the device address decoder is arranged to be exposed to the software as a device of the device network so as to enable the software executing on the processing circuitry to discover and configure the device address decoder using the enumeration mechanism, thereby enabling the allocation of the pool of addresses among the first plurality of devices to be dynamically reconfigured under software control, and
wherein the device address decoder is provided with an extended capability structure comprising a plurality of registers in which configuration information is stored under control of the software executed on the processing circuitry to enable the device address decoder to determine which device among the first plurality of devices the request is directed to.

2. A system-on-chip as claimed in claim 1, wherein the device address decoder is arranged to be exposed to the software as an integrated endpoint device.

3. A system-on-chip as claimed in claim 1, wherein the first plurality of devices comprise a plurality of bridge devices.

4. A system-on-chip as claimed in claim 1, wherein the device communication protocol is the Peripheral Component Interconnect Express (PCIe) protocol, and the device address decoder is arranged to be exposed to the software as a root complex integrated endpoint device.

5. A system-on-chip as claimed in claim 4, wherein the device address decoder has an associated root bus via which the device address decider is accessible by the software executed on the processing circuitry.

6. A system-on-chip as claimed in claim 1, wherein the extended capability structure is a Designated Vendor-Specific Extended Capability (DVSEC) structure having a header field used to identify the associated device as being the device address decoder.

7. A system-on-chip as claimed in claim 6, wherein the DVSEC structure comprises a number field to identify the number of devices in the first plurality of devices.

8. A system-on-chip as claimed in claim 7, wherein the DVSEC structure comprises memory related registers associated with each device in the first plurality of devices, which are programmed under control of the software executing on the processing circuitry to contain address information identifying which addresses within the pool are allocated to the associated device in the first plurality of devices.

9. A system-on-chip as claimed in claim 8, wherein an address space defined by the pool of addresses is formed from a plurality of address space granules, and the address information programmed into the memory related registers of the DVSEC structure identifies which address space granules are allocated to each device in the first plurality of devices.

10. A system-on-chip as claimed in claim 9, wherein, for each device in the first plurality of devices, the memory related registers in the DVSEC structure store a number of vectors used to identify which address space granules are allocated to that device.

11. A system-on-chip as claimed in claim 10, wherein the memory related registers in the DVSEC structure further identify a base address for each device in the first plurality of devices, and a size of the address space granules.

12. A system-on-chip as claimed in claim 8, wherein each device in the first plurality of devices comprises memory related registers which are programmed under control of the software executing on the processing circuitry to contain address information identifying which addresses within the pool are allocated to that device, and the software is arranged to program the memory related registers for each device within the DVSEC structure of the device address decoder to maintain the same address information as stored within the memory related registers of the individual devices in the first plurality of devices.

13. A system-on-chip as claimed in claim 4, wherein the first plurality of devices comprises a plurality of PCIe root port devices.

14. A system-on-chip as claimed in claim 13, wherein the first plurality of devices further comprise one or more integrated end point devices.

15. A system-on-chip as claimed in claim 1, wherein the pool of addresses is a memory mapped I/O (MMIO) region of the system address space.

16. A system-on-chip as claimed in claim 1, wherein the pool of addresses comprises an upper pool and a lower pool, the lower pool being within a first region of the system address space addressable using a number of address bits insufficient to identify addresses within the upper pool.

17. A method of handling address decoding in a system-on-chip having processing circuitry to perform data processing operations, a first plurality of devices, and an interconnect to couple the processing circuitry to the first plurality of devices, the first plurality of devices being a first level of devices within a hierarchical structure of devices forming a device network, the method comprising:
causing the devices within the device network to communicate using a device communication protocol, the device communication protocol providing an enumeration mechanism to enable software executed on the processing circuitry to discover and configure the devices within the network of devices;

employing an address decoder to decode an address specified by a request issued by the processing circuitry in order to determine a recipient for the request;

within a system address space, reserving a pool of addresses for allocation to the first plurality of devices;

providing a device address decoder within the address decoder to maintain, for each device in the first plurality of devices, an indication of which addresses within the pool are allocated to that device;

responsive to detecting that the address specified by the request is within the pool of addresses, employing the device address decoder to determine which device among the first plurality of devices the request is directed to and routing the request to the determined device within said first plurality; and exposing the device address decoder to the software as a device of the device network so as to enable the software executing on the processing circuitry to discover and configure the device address decoder using the enumeration mechanism, thereby enabling the allocation of the pool of addresses amongst the first plurality of devices to be dynamically reconfigured under software control, wherein the device address decoder is provided with an extended capability structure comprising a plurality of registers in which configuration information is stored under control of the software executed on the processing circuitry to enable the device address decoder to determine which device among the first plurality of devices the request is directed to.

18. A system-on-chip comprising:

processing means for performing data processing operations;

a first plurality of devices;

interconnect means for coupling the processing means to the first plurality of devices, the first plurality of devices being a first level of devices within a hierarchical structure of devices forming a device network, where devices within the device network are arranged to communicate using a device communication protocol, the device communication protocol providing an enumeration mechanism to enable software executed on the processing means to discover and configure the devices within the network of devices; and address decoder means for decoding an address specified by a request issued by the processing means in order to determine a recipient for the request;

within a system address space a pool of addresses being reserved for allocation to the first plurality of devices, and the address decoder means comprising a device address decoder means for maintaining, for each device in the first plurality of devices, an indication of which addresses within the pool are allocated to that device;

wherein the address decoder means is responsive to detecting that the address specified by the request is within the pool of addresses, to employ the device address decoder means to determine which device amongst the first plurality of devices the request is directed to and to cause the request to be routed to the determined device within said first plurality;

wherein the device address decoder means is arranged to be exposed to the software as a device of the device network so as to enable the software executing on the processing means to discover and configure the device address decoder means using the enumeration mechanism, thereby enabling the allocation of the pool of addresses among the first plurality of devices to be dynamically reconfigured under software control; and wherein the device address decoder means is provided with an extended capability structure comprising a plurality of registers in which configuration information is stored under control of the software executed on the processing means to enable the device address decoder means to determine which device among the first plurality of devices the request is directed to.

* * * * *